United States Patent [19]

Schumacher et al.

[11] Patent Number: 5,780,602

[45] Date of Patent: Jul. 14, 1998

[54] DYESTUFF MIXTURES OF FIBER-REACTIVE AZO DYESTUFFS AND THEIR USE FOR DYEING FIBER MATERIAL CONTAINING HYDROXYL AND/OR CARBOXAMIDE GROUPS

[75] Inventors: Christian Schumacher, Kelkheim; Werner Hubert Russ, Flörsheim, both of Germany

[73] Assignee: Pystar Textilfarben GmbH & Co. KG, Deutschland, Germany

[21] Appl. No.: 924,746

[22] Filed: Sep. 5, 1997

[30] Foreign Application Priority Data

Sep. 5, 1996 [DE] Germany .................. 196 35 999.6

[51] Int. Cl.⁶ .................. C09B 62/51; C09B 67/22; D06P 1/384
[52] U.S. Cl. .................. 534/642; 8/549
[58] Field of Search .................. 534/642; 8/549

[56] References Cited

FOREIGN PATENT DOCUMENTS

| | | |
|---|---|---|
| 2-073870 | 3/1990 | Japan . |
| 2-202956 | 8/1990 | Japan . |
| 3-064372 | 3/1991 | Japan . |
| 91/2676 | 5/1991 | Rep. of Korea . |
| 91/6386 | 8/1991 | Rep. of Korea . |
| 91/8343 | 10/1991 | Rep. of Korea . |

OTHER PUBLICATIONS

Tokieda et al., Chemical Abstracts, 109: 232702 (1988).
Yuda et al., Chemical Abstracts, 126:61481 (1997).

*Primary Examiner*—Fiona T. Powers
*Attorney, Agent, or Firm*—Connolly & Hutz

[57] ABSTRACT

Mixtures of fiber-reactive azo dyestuffs with which black dyeings, including prints, are obtained on fiber materials containing hydroxy and/or carboxamide groups, such as cellulosic fiber materials, wool and synthetic polyamide fibers, are described. These dyestuffs mixtures comprise one or more dyestuffs of the following formulae (1) and (2):

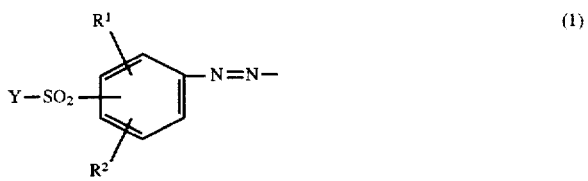

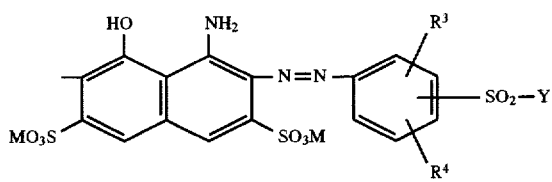

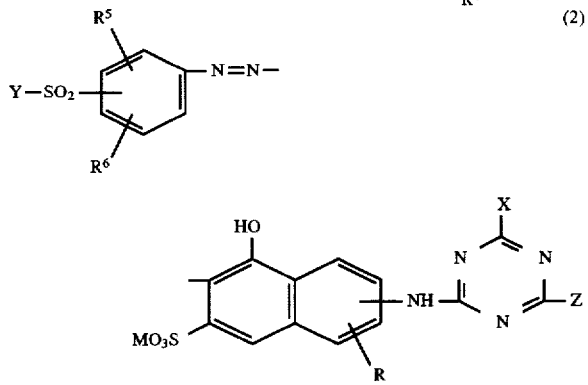

in which the substituents have the meaning given in the specification.

21 Claims, No Drawings

DYESTUFF MIXTURES OF FIBER-REACTIVE AZO DYESTUFFS AND THEIR USE FOR DYEING FIBER MATERIAL CONTAINING HYDROXYL AND/OR CARBOXAMIDE GROUPS

The invention relates to the technical field of fiber-reactive dyestuffs.

In efforts to extend or supplement the ranges of dyestuffs by modern reactive dyestuffs, boundaries are encountered in various aspects, and these cannot be overcome or can be overcome only inadequately by an individual dyestuff component. The synthesis of deep black dyestuffs without a metal complex is particularly critical. The best known black reactive dyestuff is that with the Color Index Designation C.I. Reactive Black 5, a disazo dyestuff with 3,6-disulfo-1-amino-8-naphthol as the bivalent coupling component and 4-(β-sulfatoethylsulfonyl)aniline as the two diazo components; however, the shade of this dyestuff is rather a cloudy navy blue. To obtain deep black dyeings with this, it must be mixed (shaded) with orange- or red-dyeing, but more advantageously with yellow- and red-dyeing, dyestuffs in small amounts. Any metamerism problems (different shade in artificial light) can also be addressed with these formulations.

Dyestuff mixtures which are suitable for the production of deep black dyeings on cellulosic fiber materials are indeed already known from the Japanese Patent Application Publications Hei-2-073870, Hei-2-202956 and Hei-3-64372 and from Korean Patents Nos. 91/2676, 91/6386 and 91/8343. However, these known dyestuff mixtures have certain deficiencies relating to their use, and furthermore produce dyeings with an undesirable bluish tinge; in particular, their ease of washing out, the fastness to wet laying and the dischargability are in need of improvement. The storage stability of the concentrated aqueous solutions of these dyestuff mixtures is also unsatisfactory.

With the present invention, deep black dyestuff mixtures which are advantageous in this respect and are not blueish-dyeing have been found, these mixtures comprising one or more, such as 2, 3 or 4, disazo dyestuffs corresponding to the formula (1) and one or more, such as 2, 3 or 4, monoazo dyestuffs corresponding to the formula (2), the mixtures comprising the dyestuff or dyestuffs of the formula (2) to the extent of at least 3 mol %, preferably to the extent of at least 5 mol %, based on the total amount of the dyestuffs (1) and (2) in the dyestuff mixture.

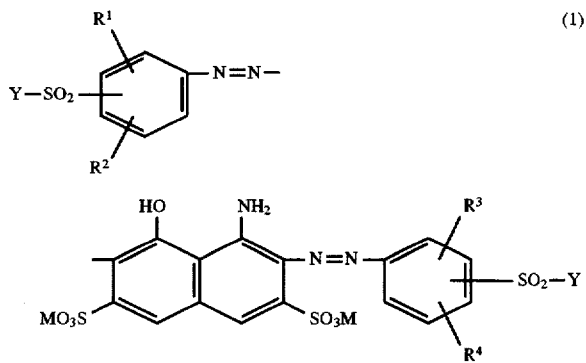

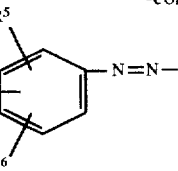

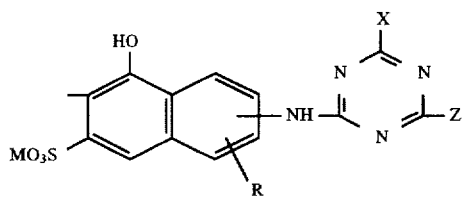

In these formulae:

M is hydrogen or an alkali metal, such as lithium, sodium and potassium;

$R^1$ is hydrogen, methyl, ethyl, methoxy, ethoxy or sulfo, preferably methoxy or hydrogen, and in particular hydrogen;

$R^2$ is hydrogen, methyl, ethyl, methoxy or ethoxy, preferably hydrogen;

$R^3$ is hydrogen, methyl, ethyl, methoxy, ethoxy or sulfo, preferably methoxy or hydrogen, and in particular hydrogen;

$R^4$ is hydrogen, methyl, ethyl, methoxy or ethoxy, preferably hydrogen;

$R^5$ is hydrogen, methyl, ethyl, methoxy, ethoxy or sulfo, preferably methoxy or hydrogen, and in particular hydrogen;

$R^6$ is hydrogen, methyl, ethyl, methoxy or ethoxy, preferably hydrogen;

Y is in each case independently of one another vinyl, β-chloroethyl, β-thiosulfatoethyl or β-sulfatoethyl;

R is in the 3- or 4-position on the 6-sulfo-8-hydroxy-naphth-7-yl radical and is hydrogen or sulfo;

X is chlorine or hydroxy, preferably hydroxy;

Z is chlorine or hydroxy, preferably hydroxy;

the triazinylamino group in formula (2) is bonded in the 2- or 3-position on the 6-sulfo-8-hydroxy-naphth-7-yl radical if R is hydrogen, in the 1- or 3-position on the 6-sulfo-8-hydroxy-naphth-7-yl radical if R is 4-sulfo, and in the 1-position on the 6-sulfo-8-hydroxy-napth-7-yl radical if R is 3-sulfo; and if X and Z are both chlorine, the mixture necessarily comprises at least one further dyestuff of the formula (2) where X or Z is hydroxy.

Preferred mixtures according to the invention which are to be mentioned are those with a dyestuff of the formula (2) in which R is hydrogen and the triazinylamino group is bonded in the 3-position on the 6-sulfo-8-hydroxy-naphthalene radical.

The dyestuff mixtures according to the invention of the dyestuffs of the formulae (1) and (2) can optionally additionally contain, according to the invention, one or two monoazo dyestuffs of the formula (3), optionally one or more, such as 2 or 3, monoazo dyestuffs of the formula (4) and optionally one or more, such as 2 or 3, monoazo dyestuffs of the formula (5)

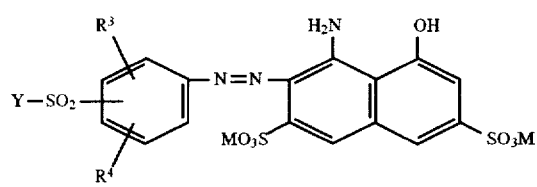
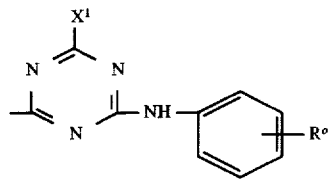
(3)

(a)

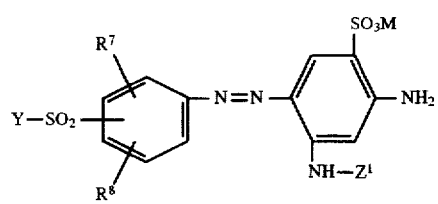
(4)

in which

X¹ is chlorine, fluorine or cyanoamino and

R° is sulfo, carboxy or a group of the formula —SO₂—Y, where Y has one of the abovementioned meanings, and

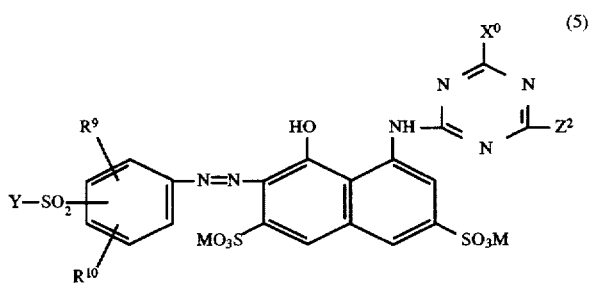
(5)

Z¹ is preferably acetyl or a group of the formula (a);

X° is chlorine, fluorine or hydroxy;

Z² is chlorine, morpholino or a group of the formula (b)

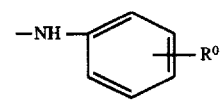
(b)

in which:

R³, R⁴, M and Y have one of the abovementioned meanings;

R⁷ is hydrogen, methyl, ethyl, methoxy or ethoxy, preferably methoxy or hydrogen, and in particular hydrogen;

R⁸ is hydrogen, methyl, ethyl, methoxy or ethoxy, preferably hydrogen;

R⁹ is hydrogen, methyl, ethyl, methoxy or ethoxy, preferably methoxy or hydrogen, and in particular hydrogen;

R¹⁰ is hydrogen, methyl, ethyl, methoxy or ethoxy, preferably hydrogen;

Z¹ is alkanoyl having 2 to 5 carbon atoms, such as propionyl and acetyl, or is benzoyl or 2,4-dichloro-1,3,5-triazin-6-yl, or is a group of the formula (a)

where R° has one of the abovementioned meanings.

Both in the abovementioned formulae and in the formulae given below, the individual formula members, both of a different and of the same designation within a formula, can have meanings which are identical to one another or different from one another in the scope of their meaning.

A sulfo group is a group of the formula —SO₃M, a carboxy group is a group of the formula —COOM, a sulfato group is a group of the formula —OSO₃M and a thiosulfato group is a group of the formula —S—SO₃M, in each case where M has the abovementioned meaning.

Preferred dyestuffs of the formula (2) are those which correspond to the formula (2A)

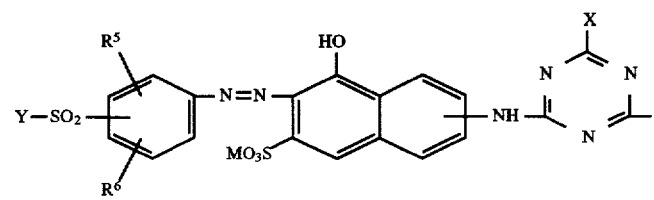
(2A)

in which M, Y, R⁵, R⁶, X and Z have the abovementioned particularly preferred meanings and the triazinylamino group is bonded in the 2- or, preferably, in the 3-position on the 6-sulfo-8-hydroxy-naphth-7-yl radical.

The dyestuffs of the formula (2) in which X and Z are both hydroxy are novel and the invention also relates to these.

These novel compounds of the formulae (3A) and (3B)

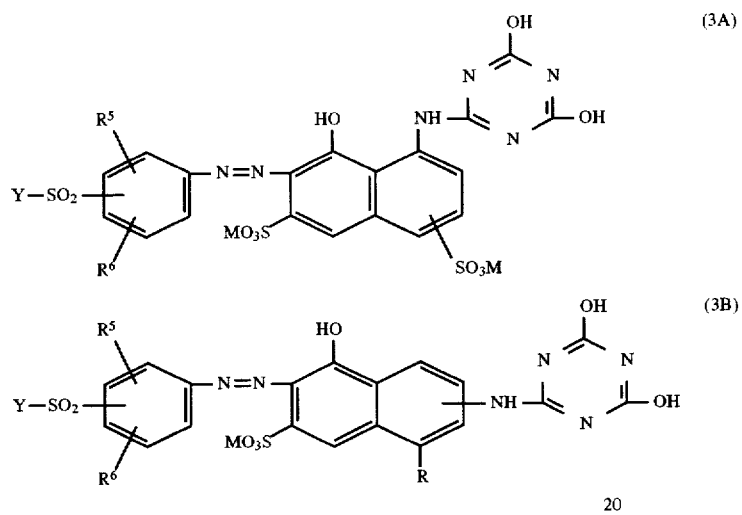

in which M, Y, R⁵ and R⁶ have the abovementioned meanings, the one group —SO₃M in formula (3A) is bonded to the triazinylamino group in the meta- or para-position and the triazinylamino group in formula (3B) is bonded in the 2- or 3-position on the 6-sulfo-8-hydroxy-naphth-7-yl radical if R is hydrogen and in the 3-position on the 6-sulfo-8-hydroxy-naphth-7-yl radical if R is sulfo, can be prepared according to the invention by allowing hydroxyl ions to act on a compound of the formula (3a) or (3b)

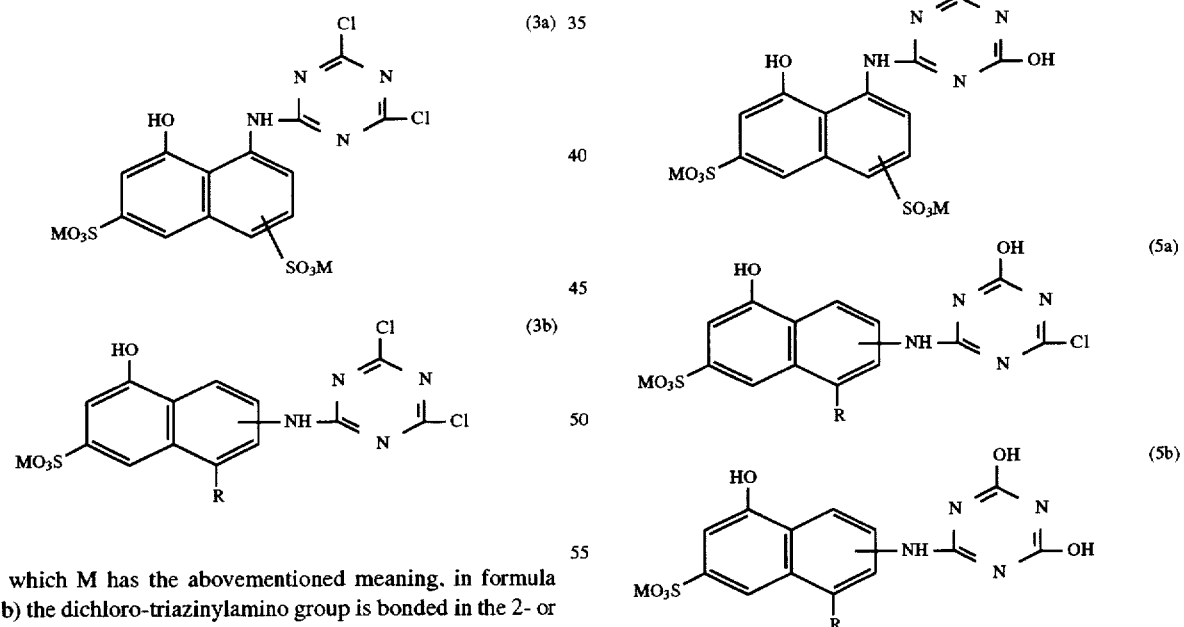

in which M has the abovementioned meaning, in formula (3b) the dichloro-triazinylamino group is bonded in the 2- or 3-position on the 6-sulfo-8-hydroxy-naphth-7-yl radical if R is hydrogen and in the 3-position on the 6-sulfo-8-hydroxy-naphth-7-yl radical if R is sulfo, in an aqueous medium at a temperature between 40° and 80° C. and at a pH between 10 and 13, or by carrying out the hydrolysis at a temperature between 70° and 100° C. and a pH of between 2 and 5. The resulting solution with a compound of the formula (4b) or (5b) or a mixture of compounds of the formulae (4a) and (4b) or (5a) and (5b)

in which M has the abovementioned meaning and in formulae (5a) and (5b) the hydroxy-chloro-triazinylamino or dihydroxy-triazinylamino group is bonded in the 2- or 3-position on the 6-sulfo-8-hydroxy-naphth-7-yl radical if R is hydrogen and in the 3-position on the 6-sulfo-8-hydroxy-naphth-7-yl radical if R is sulfo, is then brought to a pH of between 5 and 7 and the compounds of the formulae (4a) and (4b) or the compounds of the formulae (5a) and (5b) are coupled with the diazonium salt of an amino compound of the formula (6)

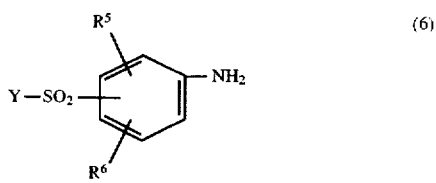

in which Y, $R^5$ and $R^6$ have one of the abovementioned meanings, in the customary manner at a temperature between 5° C. and 35° C. and at a pH of between 4 and 7.

The intermediate products of the formulae (4a) and (4b) or of the formulae (5a) and (5b) are obtained in a molar mixture ratio of between about 70:30 and 0:100 in the hydrolysis reaction in the alkaline range. The mixture ratio depends on the hydrolysis conditions, the proportion of the dihydroxy-triazinylamino compounds being increased significantly, or these compounds being formed completely, on increasing the reaction temperature (preferably 60° and 80° C.) and also on increasing the pH (preferably at a pH of between 12 and 13).

also comprise dyestuffs of the formulae (3), (4) or (5) or a combination of these dyestuffs, the mixture comprises the dyestuffs of the formula (3) as a rule to the extent of up to 8 mol %, based on the total amount of the dyestuffs (1) and (2), the dyestuffs of the formula (4) as a rule to the extent of up to 35 mol % and the dyestuffs of the formula (5) as a rule to the extent of up to 15 mol %, also in each case based on the total amount of the dyestuffs (1) and (2).

If the dyestuff mixtures according to the invention comprise two or more dyestuffs corresponding to the formula (2) in which X is chlorine or hydroxy and Z is chlorine or hydroxy, the dyestuff or dyestuffs where X and Z are both chlorine or the dyestuff or dyestuffs where X is chlorine and Z is hydroxy and the dyestuff or dyestuffs where X and Z are both hydroxy are preferably present in a molar mixture ratio to one another of between 20:60:20 to 0:0:100, preferably 10:20:70 to 0:5:95.

Particularly preferred mixtures are those of dyestuffs of the formulae (11), (12A) and (12B)

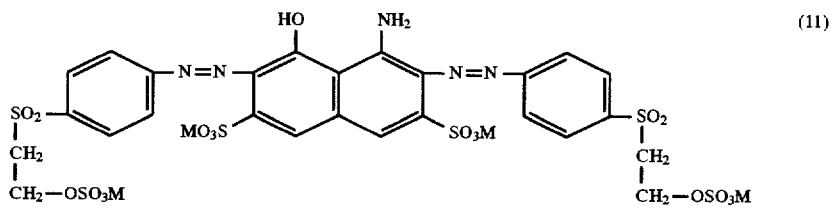

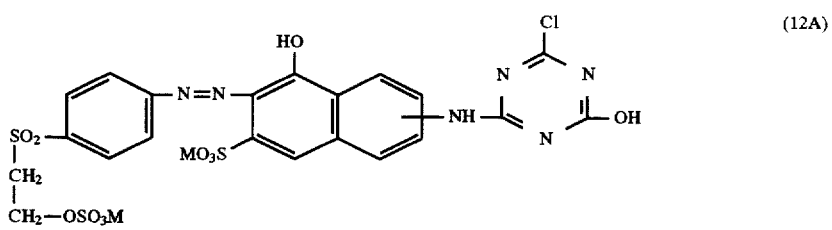

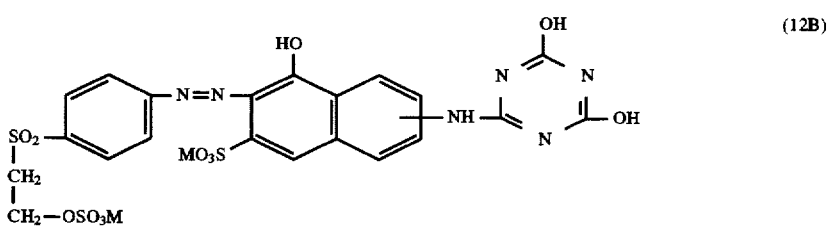

The other dyestuffs corresponding to the formulae (1) to (5) are as a rule generally known, for example from the German Patents Nos. 960 534 and 965 902, the U.S. Pat. No. 4,257,770 and the European Patents Nos. 0 032 187, 0 094 055, 0 073 481 and 0 061 151, or if one or other of them has not yet been described specifically in the literature, they can be prepared by procedures analogous to those described therein.

The groups Y—$SO_2$— are preferably bonded in the meta-position and particularly preferably in the para-position relative to the azo groups or amino groups on the benzene radical. Y—$SO_2$— is preferably vinylsulfonyl, and particularly preferably β-sulfatoethylsulfonyl.

The azo dyestuffs of the formulae (1) and (2) are in general present in the mixtures according to the invention in a molar mixture ratio of between 97:3 and 60:40, preferably between 90:10 and 65:35, in particular between 85:15 and 68:32. If these dyestuff mixtures according to the invention in which M has the abovementioned meaning and in the formulae (12A) and (12B) the triazinylamino group is bonded in the 2- or, preferably, in the 3-position on the 6-sulfo-8-hydroxy-naphth-7-yl radical, the molar mixture ratio of the dyestuffs (11):(12A):(12B) being between 97:0:3 and 60:8:32. Mixtures which are furthermore preferred are those of dyestuffs of the formulae (11), (12A), (12B), (12C) and (12D)

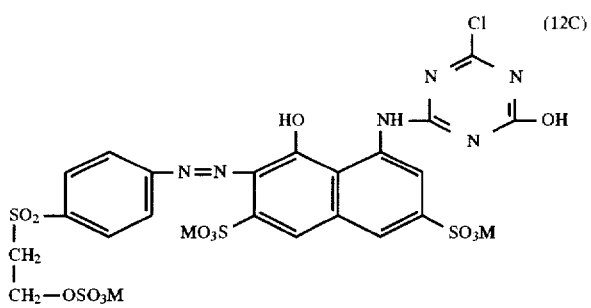

(12C)

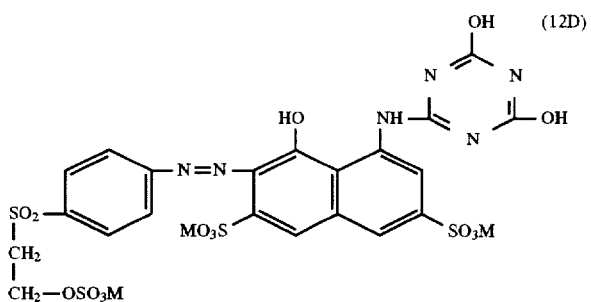

(12D)

where M has the abovementioned meaning. in which the mixture ratio of the dyestuffs (11):(12A):(12B):(12C):(12D) is between 97:0:3:0:3 and 60:5:25:3:7.

Mixtures of dyestuffs (11) and dyestuffs (12C) and (12D) in which the molar mixture ratio of the dyestuffs (11):(12C):(12D) is between 97:3:0 and 60:8:32 are also preferred.

Radicals of diazo components in the formulae (1) to (5) and radicals of the formula R°-phenyl in the formulae (a) and (b) are, for example, 3-(β-sulfatoethylsulfonyl)phenyl, 4-(β-sulfatoethylsulfonyl)phenyl, 2-methyl-5-methoxy-4-(β-sulfatoethylsulfonyl)phenyl, 2-methoxy-5-(β-sulfatoethylsulfonyl)phenyl and 2,5-dimethoxy-4-(β-sulfatoethylsulfonyl)phenyl and vinylsulfonyl, β-chloroethylsulfonyl and β-thiosulfatoethylsulfonyl derivatives thereof, and 3-sulfophenyl and 4-sulfophenyl, and of these preferably 2-methoxy-5-(β-sulfatoethylsulfonyl) phenyl and 2,5-dimethoxy-4-(β-sulfatoethylsulfonyl)phenyl and in particular 3-(β-sulfatoethylsulfonyl)phenyl and 4-(β-sulfatoethylsulfonyl) phenyl or 3-sulfophenyl.

The dyestuffs of the formulae (1) to (5) can have different fiber-reactive groups —SO₂—Y within the meaning of Y, especially if the chromophore is the same. In particular, the dyestuff mixtures can comprise dyestuffs with the same chromophore in which the fiber-reactive groups —SO₂—Y on the one hand are vinylsulfonyl groups and on the other hand are β-chloroethylsulfonyl or β-thiosulfatoethylsulfonyl or, preferably, β-sulfatoethylsulfonyl groups. If the dyestuff mixtures comprise the particular dyestuff components in the form of a vinylsulfonyl dyestuff, the proportion of the particular vinylsulfonyl dyestuff to the particular β-chloro- or β-thiosulfato- or β-sulfatoethylsulfonyl dyestuff is preferably up to about 10 mol %, based on the particular dyestuff chromophore.

Those dyestuff mixtures in which the proportion of the vinylsulfonyl dyestuffs to the β-sulfatoethylsulfonyl dyestuffs is in a molar ratio of between 2:98 and 10:90 are preferred here.

The dyestuff mixtures according to the invention can be present as a preparation in solid or in liquid (dissolved) form. In the solid form, they may generally contain the electrolyte salts customary for water-soluble and, in particular, fiber-reactive dyestuffs, such as sodium chloride, potassium chloride and sodium sulfate, and can furthermore contain the auxiliaries customary in commercial dyestuffs, such as buffer substances, which are capable of establishing a pH in aqueous solution of between 3 and 7, such as sodium acetate, sodium borate, sodium bicarbonate, sodium dihydrogen phosphate and disodium hydrogen phosphate, small amounts of siccatives or agents which improve the solubility, such as the known naphthalenesulfonic acid-formaldehyde condensation products, or, if they are present in liquid, aqueous solution (including the content of thickeners, such as are customary in printing pastes), they may contain dissolved the above-mentioned substances, too, except the siccatives, and may contain substances which ensure the storage stability of these preparations, such as, for example, mold-preventing agents.

The dyestuff mixtures according to the invention are in general present as dyestuff powders or granules (in the following text, the latter are intended to be included in the terms "powder/powdered") which comprise electrolyte salts and have a total dyestuff content of 20 to 70% by weight, based on the dyestuff powder or the preparation. These dyestuff powders/preparations can furthermore comprise the buffer substances mentioned in a total amount of up to 5% by weight, based on the dyestuff powder. If the dyestuff mixtures according to the invention are present in aqueous solution, the total dyestuff content in these aqueous solutions is up to about 50% by weight, such as, for example, between 5 and 40% by weight, the electrolyte salt content in these aqueous solutions preferably being below 10% by weight, based on the aqueous solution; the aqueous solutions (liquid preparations) can as a rule comprise the buffer substances mentioned in an amount of up to 5% by weight, preferably up to 2% by weight. Both the aqueous and pulverulent preparations can comprise a customary auxiliary.

The dyestuff mixtures according to the invention can be prepared in the customary manner, thus by mechanical mixing of the individual dyestuffs or of mixtures of 2 or 3 such individual dyestuffs with the other individual dyestuffs in the form of their dyestuff powders or aqueous solutions. If the dyestuff mixtures according to the invention are prepared by mechanical mixing of the individual dyestuffs, any necessary standardizing agents, dust removal agents or further auxiliaries which are customary in dyeing and are customary in the dyestuff preparations used in this context are added during mixing.

If aqueous dyestuff solutions of the individual components (individual dyestuffs) or, if appropriate, dyestuff solutions which already comprise two or more of these individual components are used as the starting materials, the desired dyestuff mixture is also obtained in aqueous form (liquid preparation) by simple mixing, taking into account the amounts of the dyestuff solutions and their dyestuff concentrations. Such aqueous dyestuff solutions of the individual components or mixtures of such individual components can also be synthesis solutions which are obtainable from the synthesis of the individual components or, if the synthesis allows, from the synthesis of mixtures of individual dyestuffs. The aqueous solutions which comprise the dyestuff mixtures according to the invention and are obtained thus by mixing the individual dyestuff solutions (synthesis solutions) can then be put to use for dyeing directly as a liquid preparation, if appropriate after filtration, concentration and/or addition of a buffer or other auxiliaries. The total dyestuff content in these liquid preparations is as a rule between 10 and 50 percent by weight, preferably between 15 and 40 percent by weight. The powdered or granulated dyestuff mixtures according to the invention of the desired composition and formulation can also be obtained from them, for example by spray drying and, if necessary, in a fluidized bed.

However, to establish desired dyestuff mixture ratios and color shade hues, the aqueous dyestuff solutions according to the invention comprising the dyestuff mixtures according to the invention can particularly advantageously be mixed with one another according to the invention in a manner such that the color shade of the mixture is controlled with an ATR probe during addition of the components (the dyestuff solutions). Multicomponent analysis with the aid of UV/VIS spectra is used for this. The precise amounts and dyestuff concentrations of the individual components (individual dyestuffs) contained in the aqueous starting solutions are first determined by this means, and the components are then mixed with one another in the required amounts under the control of a control method by means of an ATR probe. The procedure is based on the recording of UV/VIS spectra with the aid of a photo diode spectrometer (in this context, cf. also EP-A-0 385 587) or a fast-scanning grating spectrometer with subsequent multicomponent analysis which, after calibration with the pure individual dyestuffs or mixtures of such dyestuffs or their aqueous solutions, with mathematical breakdown into the individual components, gives precise data on the amounts and concentrations of dyestuff in the solutions. The current content of the dyestuff can be read off via a monitor at any point in time. By a high resolution of the measuring equipment, even the smallest absorption shoulders, which serve to demarcate the dyestuffs precisely from one another, can be recorded.

It has proved appropriate to measure calibration series of the dyestuffs to be determined before the start of measurement. The calibration measurements can thus comprise both individual components and mixtures of several components. The precise concentrations are entered into the computer program, separately according to dyestuff. The concentration range of the calibration solutions should comprise the measurement range. From these data, a calibrated matrix is calculated, this being necessary for later determination of the dyestuff components. The multicomponent analysis employed here is understood as meaning quantitative analysis of dyestuff mixtures which uses the following mathematical algorithm: Partial Least Squares Type 1 (PLS-1), Partial Least Squares Type 2 (PLS-2)—methods of least squares, principal component regression analysis (PCR) and classic least squares (CLS) or inverse least squares (ILS). The method of least squares (PLS) and the principal component regression (PCR) are described, for example, in Anal. Chem. 1988, 60, 1193, Anal. Chem. 1988, 60, 1202 and Anal. Chem. 1990, 62, 1091 by D. Haaland and E. V. Thomas and in A. Tutorial, Laboratory for Chemometrics and Center for Process Analytical Chemistry, Dept. of Chemistry, University of Washington, Seattle, Wash. 98195, by P. Geladi and B. Kowalewski. The aim of these mathematical designs is to obtain mathematical equations by which the content of the unknown mixtures can be determined. The principle of the PLS algorithm is to breakdown the spectra obtainable into a series of mathematical spectra which are described as factors. A detailed description of the procedure is obtainable from the literature stated.

The individual dyestuff solutions are pumped through a flow-through cell via a feed and a discharge. The cell diameter can be down to 0.01 cm in size, so that highly concentrated solutions can also be measured. The cell is in a UV/VIS spectrometer, which is either a diode line spectrometer or a fast-scanning grating spectrometer. Dyestuff solutions of individual components (individual dyestuffs) can be directly measured by spectroscopy. In the case of dyestuff mixtures which can be analyzed directly, without an intermediate processing step, the ATR measuring technique (attenuated total reflection) can be employed. In this technique, a quartz or alkali metal glass rod or a light-transporting device suitable for this purpose is immersed in the solution to be measured and the measurement is performed at the interface between crystal and liquid. The samples usually employed for this purpose have a concentration of 5 to 150 g/l of dyestuff. The ATR probe is connected to the spectrometer via a glass fiber light conductor. The length of the light conductor can be up to 1000 m for measurements in the VIS range, and for this reason the spectrometer can be accommodated centrally in a measuring station. In explosion-proof plants, it is therefore not necessary to take further precautions.

To be able to formulate an aqueous solution according to the invention of the dyestuff mixture with a certain dyestuff content and a certain dyestuff composition of the mixture, the target mixture must be measured and its color coordinates and percentage composition determined. During formulation or metering of the individual components, these data serve as target parameters, against which the color difference and the individual concentrations are calculated and plotted on graphs. An addition of the dyestuffs required for this as components of the mixture to an already introduced dyestuff of the mixture according to the invention, such as, for example, the main component in terms of quantity, corresponding to the dyestuffs of the formula (1), is thus carried out only until the target concentrations and the target color shade are reached.

Alternatively, it is also possible to use as starting substances mixtures of the coupling components on which the dyestuffs are based, to which the diazonium salt of a corresponding amine of the formula (10)

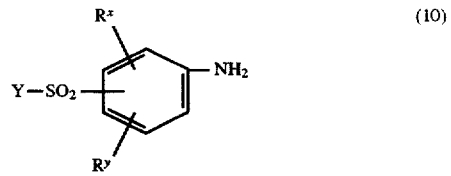

in which Y has one of the abovementioned meanings and $R^x$ has one of the meanings of $R^1$ and $R^y$ has one of the meanings of $R^2$ is added, coupling being carried out with this diazo component in the customary manner at a temperature between 0° and 35° C. and a pH between 4 and 7. The mixtures according to the invention of the dyestuffs (1) to (5) in which the formula radicals $R^1$, $R^3$, $R^5$ and $R^9$ have the same meaning of $R^x$ and $R^2$, $R^4$, $R^6$, $R^8$ and $R^{10}$ have the same meaning of $R^y$ are obtained in this manner.

The dyestuff mixtures according to the invention produce deep black dyeings with a good color build-up, good dischargeability and particularly good ease of washing out of non-fixed dyestuff portions from the dyed materials on fiber materials containing hydroxy and/or carboxamide groups by the application and fixing processes described in numerous instances in the art of fiber-reactive dyestuffs.

The present invention thus also relates to the use of the dyestuff mixtures according to the invention for dyeing (including printing) fiber materials containing hydroxy and/or carboxamide groups, and to processes for dyeing such fiber materials using a dyestuff mixture according to the invention by applying the dyestuff mixture in dissolved form to the substrate and fixing the dyestuffs to the fiber by the action of an agent having an alkaline action or by heat or by both measures.

Materials containing hydroxy groups are naturally occurring or synthetic materials containing hydroxy groups, such as, for example, cellulosic fiber materials, also in the form of paper, or regenerated products thereof, and polyvinyl alcohols. Cellulosic fiber materials are preferably cotton, but also other plant fibers, such as linen, hemp, jute and ramey fibers; regenerated cellulosic fibers are, for example, viscose staple and filament viscose.

Materials containing carboxamide groups are, for example, synthetic and naturally occurring polyamides and polyurethanes, in particular in the form of fibers, for example wool and other animal hair, silk, leather, polyamide-6.6, polyamide-6, polyamide-11 and polyamide-4.

The dyestuff mixtures according to the invention are used by generally known processes for dyeing and printing fiber materials according to the known use techniques for fiber-reactive dyestuffs. Since the dyestuffs of the dyestuff mixtures according to the invention show very good combination properties with one another, the dyestuff mixtures according to the invention can also advantageously be employed in the exhaust dyeing processes and also in the customary pad-dyeing processes, such as the short-time pad-batch process, and continuous processes. Dyeings in very good color yields and with an excellent color build-up and the same shade are accordingly obtained with them, for example on cellulosic fibers by the exhaust process from a long liquor at temperatures between 40° and 105° C., if appropriate at temperatures up to 130° C. under pressure, and if appropriate in the presence of customary dyeing auxiliaries, using an agent having an alkaline action and, if appropriate, neutral salts, such as sodium chloride or sodium sulfate. A procedure can be followed here in which the material is introduced into the warm bath, this is gradually heated up to the desired dyeing temperature and the dyeing process is brought to completion at this temperature. If desired, the neutral salts, which accelerate exhaustion of the dyestuffs, can also be added to the bath only when the actual dyeing temperature is reached.

In the pad-dyeing process, the goods are impregnated with aqueous dyestuff solutions, which contain salts if appropriate, and the dyestuff is fixed after an alkali treatment or in the presence of alkali, if appropriate under the action of heat, such as by IR irradiation, hot air or hot steam, it being possible for this procedure to be conducted continuously. In the so-called short-time cold pad-batch process, the dyestuff is applied to the fabric by means of the padder together with the alkali and is then fixed by storage at room temperature or slightly elevated temperature for several hours.

Intense prints with a good contour status and a clear white background are also obtained by the customary printing processes for cellulosic fibers—which either can be carried out in one phase, for example by printing with a printing paste comprising sodium bicarbonate or another acid-binding agent and the colorant and by subsequent steaming at 100° to 103° C., or can be carried out in two phases, for example by printing with a neutral or weakly acid printing paste comprising the colorant and subsequent fixing either by passing the printed goods through a hot electrolyte-containing alkaline bath or by overpadding with an alkaline electrolyte-containing padding liquor, with subsequent batching of this treated material or subsequent steaming or subsequent treatment with dry heat. The appearance of the prints depends only little on varying fixing conditions. The degrees of fixing obtained with the dyestuff mixtures according to the invention are very high both in dyeing and in printing. In the case of fixing by means of dry heat by the customary thermofixing processes, hot air of 120° to 200° C. is used. In addition to the customary steam of 101° to 103° C., it is also possible to employ superheated steam and pressurized steam with temperatures up to 160° C.

After the fixing, the dyeings or prints are rinsed thoroughly with cold and hot water, if appropriate with the addition of a customary auxiliary and an alkali-binding agent, such as acetic acid. These dyeing processes are described in numerous instances in the general technical literature and also in the patent literature.

The agents which have an alkaline action and cause fixing of the dyestuffs onto to the cellulosic fibers are, for example, water-soluble basic salts of alkali metals and alkaline earth metals of inorganic or organic acids, and also compounds which liberate alkali under the action of heat. Inparticular, the alkali metal hydroxides and alkali metal salts of weak to moderately strong inorganic or organic acids may be mentioned, the alkali metal compounds meaning preferably the sodium and potassium compounds. Such acid-binding agents are, for example, sodium hydroxide, potassium hydroxide, sodium carbonate, sodium bicarbonate, potassium carbonate, sodium formate, sodium dihydrogen phosphate and disodium hydrogen phosphate.

By treatment of the dyestuffs of the dyestuff mixtures according to the invention with an agent having an alkaline action, if appropriate under the action of heat, the dyestuffs are bonded chemically to the cellulosic fiber; in particular, the dyeings on cellulose show excellent wet-fastness properties after the customary after-treatment by rinsing to remove non-fixed dyestuff portions, especially since non-fixed dyestuff portions can easily be washed out because of their good solubility in cold water.

The dyeings on polyurethane and polyamide fibers are usually carried out from an acid medium. Thus, for example, acetic acid and/or ammonium sulfate and/or acetic acid and ammonium acetate or sodium acetate can be added to the dyebath in order to obtain the desired pH. To achieve a useable levelness of the dyeing, it is advisable to add a customary leveling auxiliary, such as, for example, one based on a reaction product of cyanuric chloride with three times the molar amount of an aminobenzenesulfonic acid or aminonaphthalenesulfonic acid or based on a reaction product of, for example, stearylamine with ethylene oxide. As a rule, the material to be dyed is introduced into the bath at a temperature of about 40° C. and agitated therein for some time, the dyebath is then adjusted to the desired weakly acid, preferably weakly acetic acid, pH and the actual dyeing is carried out at a temperature between 60° and 98° C. However, the dyeings can also be carried out at the boiling point or at temperatures up to 120° C. (under pressure).

The following Examples serve to illustrate the invention. The parts are parts by weight and the percentage data are percentages by weight, unless noted otherwise. Parts by weight bear the same ratio to parts by volume as the kilogram to the liter.

In the Examples, the formulae of the dyestuffs are given in the form of the free acid; the amounts parts relate to the acid form. As a rule, however, the dyestuffs are employed in the form usually present for water-soluble dyestuffs as an alkali metal salt powder comprising electrolyte salts (for example containing sodium chloride or sodium sulfate). The amounts stated are to be understood as being by way of example and do not limit the possible formulation of different shades.

EXAMPLE 1

50 parts of an aqueous solution, such as, for example, an aqueous solution obtainable from the synthesis, comprising 14 parts (=14.12 mmol) of the navy-blue-dyeing disazo dyestuff of the formula (A)

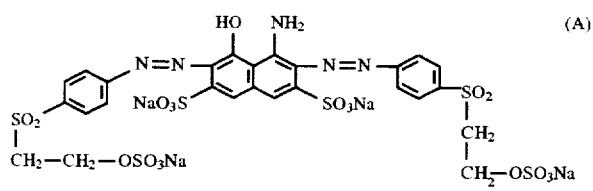

and 1 part (=1.48 mmol) of the red-dyeing monoazo dyestuff of the formula (B)

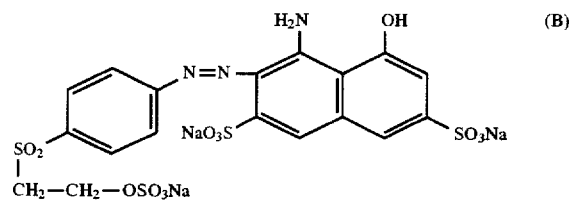

10 parts of an aqueous solution, such as, for example, an aqueous solution obtainable from the synthesis, comprising 2 parts (2.80 mmol) of the red monoazo dyestuff of the formula (C)

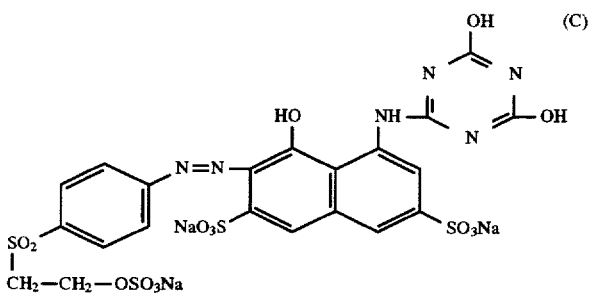

15 parts of an aqueous solution, such as, for example, an aqueous solution obtainable from the synthesis, comprising 2.15 parts (=3.8 mmol) of the golden yellow-dyeing monoazo dyestuff of the formula (D)

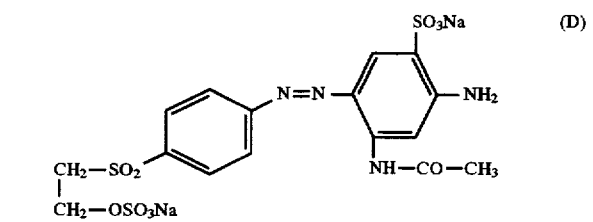

and 25 parts of an aqueous solution, such as, for example, an aqueous solution obtainable from the synthesis, comprising 2.5 parts (=3.64 mmol) of the orange-dyeing dyestuff of the formula (E)

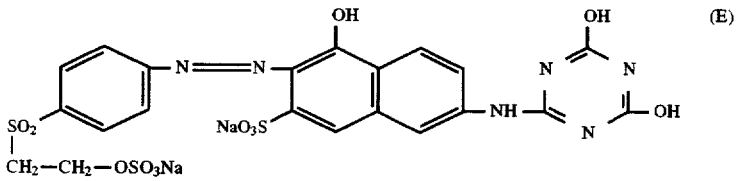

(where these solutions can also comprise electrolyte salts, such as sodium chloride, or customary auxiliaries, such as, for example, buffers and surfactant substances) are mixed with one another.

The resulting aqueous dyestuff mixture according to the invention can be put to use for dyeing directly or converted into the solid form by spray drying and, if appropriate, granulation, and produces dyeings and prints with a good ease of washing out of non-fixed dyestuff portions and good fastness to wet laying in a deep black, which does not change shade between daylight and twilight by the application and fixing processes customary in the art of fiber-reactive dyestuffs, for example on cellulosic fiber materials.

EXAMPLE 2

50 parts of an aqueous solution, such as, for example, an aqueous solution obtainable from the synthesis, comprising 14 parts of the navy-blue-dyeing disazo dyestuff of the formula (A) and 1 part of the red-dyeing monoazo dyestuff of the formula (B), 10 parts of an aqueous solution, such as, for example, an aqueous solution obtainable from the synthesis, comprising 4 parts of the red monoazo dyestuff of the formula (C), and 33.8 parts of an aqueous solution, such as, for example, an aqueous solution obtainable from the synthesis, comprising 4.83 parts of the golden yellow-dyeing monoazo dyestuff of the formula (D) (where these solutions also comprise or can also comprise electrolyte salts, such as sodium chloride, or customary auxiliaries, such as, for example, buffers and surfactant substances) are mixed with one another by means of the analysis system explained in the general description section and by means of the resulting control of pumps which meter the dyestuff solutions. Target parameters used for this are the color site and the individual dyestuff concentrations of a dyestuff mixture according to the present invention which has been compiled in a conventional manner and has been defined by the colorist as the desired dyestuff mixture. During the addition of the dyestuffs (C) and (D) to the dyestuff solution of the dyestuffs (A) and (B), the color difference and the concentration of the individual dyestuffs of the mixture instantaneously present is recorded at any time on the monitor. When the target data are reached, the addition of the dyestuff solutions is stopped.

The resulting aqueous dyestuff mixture according to the invention can be put to use directly for dyeing or converted into the solid form by spray drying and, if appropriate, granulation. It produces dyeings and prints with a good ease of washing out of non-fixed dyestuff portions and good fastness to wet laying in a deep black, which does not change shade between daylight and twilight, by the application and fixing processes customary in the art of fiber-reactive dyestuffs, for example on cellulosic fiber materials.

EXAMPLE 3

The procedure is according to the procedure of Example 1 or 2, but using 50 parts of an aqueous solution comprising 14 parts of the dyestuff of the formula (A) and 1 part of the dyestuff of the formula (B), 10 parts of an aqueous solution of 2 parts of the dyestuff of the formula (C), 5 parts of an aqueous solution comprising 0.7 part of the dyestuff of the formula (E) and 35 parts of an aqueous solution comprising 6.9 parts of the dyestuff of the formula (F)

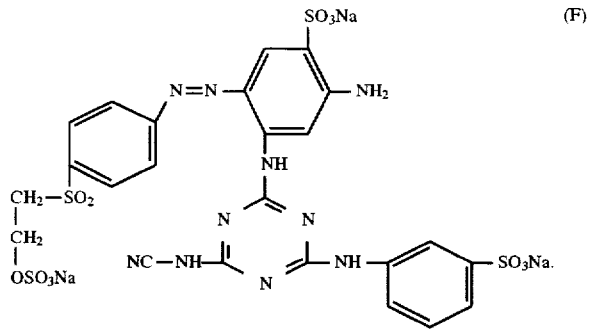

The resulting aqueous dyestuff mixture according to the invention can be put to use directly for dyeing or converted into the solid form by spray drying and, if appropriate, granulation. It produces dyeings and prints with a good ease of washing out of non-fixed dyestuff portions and good fastness to wet laying in a deep black, which does not change shade between daylight and twilight, by the application and fixing processes customary in the art of fiber-reactive dyestuffs, for example on cellulosic fiber materials.

EXAMPLE 4

In accordance with the instructions of Example 1 or 2, 100 parts of an aqueous solution comprising 30 parts of the disazo dyestuff of the abovementioned formula (A) and 1 part of the monoazo dyestuff of the abovementiond formula (B), and 25 parts of an aqueous solution comprising 1 part of the dyestuff of the formula (G) mentioned below and 5.5 parts of the dyestuff of the formula (E) mentioned in Example 1 are mixed with one another and, if appropriate after addition of customary auxiliaries, the mixture is converted into a liquid or solid (pulverulent or granulated) dyeing preparation.

This dyestuff mixture according to the invention dyes, for example, cellulosic fibers in deep black shades with good fastnesses to washing by the application and use methods customary for fiber-reactive dyestuffs.

EXAMPLE 6

100 parts of an aqueous solution comprising 30 parts of the disazo dyestuff of the abovementioned formula (A) and 1.6 parts of the monoazo dyestuff of the abovementioned formula (B), and 25 parts of an aqueous solution comprising 3.2 parts of the dyestuff of the abovementioned formula (E) and 1.6 parts of the dyestuff of the abovementioned formula (G) are mixed with one another and, if appropriate, customary dyeing auxiliaries and/or buffer substances are added.

The resulting aqueous dyestuff mixture according to the invention can be put to use directly for dyeing or converted into the solid form by spray drying or granulation. It produces dyeings and prints with a good ease of washing out of the non-fixed dyestuff portions and good fastness to washing in a deep black by the application and fixing processes customary in the art of fiber-reactive dyestuffs, for example on cellulosic fiber materials.

EXAMPLE 7

100 parts of an aqueous solution comprising 30 parts of the disazo dyestuff of the abovementioned formula (A) and 1 part of the monoazo dyestuff of the abovementioned formula (B), and 10 parts of an aqueous solution comprising 1.5 parts of the dyestuff of the abovementioned formula (C) and 20 parts of an aqueous solution comprising 3.5 parts of the dyestuff of the abovementioned formula (E) (where these solutions can also comprise electrolyte salts, such as sodium chloride, or customary auxiliaries, such as, for example, buffers and surfactant substances) are mixed with one another.

The resulting aqueous dyestuff mixture according to the invention can be put to use directly for dyeing or converted into the solid form by spray drying and, if appropriate, granulation. It produces dyeings and prints with a good ease

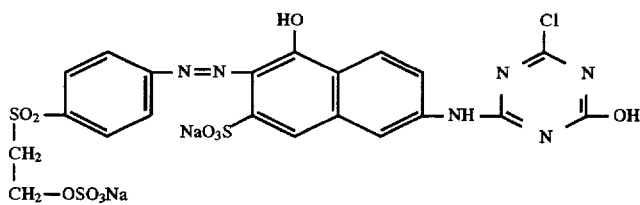

This dyestuff mixture according to the invention dyes, for example, cellulosic fibers in deep black shades with good fastness properties, for example good fastnesses to washing, by the application and use methods customary for fiber-reactive dyestuffs.

EXAMPLE 5

In accordance with the instructions of Example 1 or 2, 100 parts of an aqueous solution comprising 30 parts of the disazo dyestuff of the abovementioned formula (A) and 0.3 part of the monoazo dyestuff of the abovementioned formula (B), and 25 parts of an aqueous solution comprising 0.3 part of the dyestuff of the abovementioned formula (E) and 5.7 parts of the dyestuff of the abovementioned formula (G) are mixed with one another and, if appropriate after addition of customary auxiliaries, the mixture is converted into a solid or liquid (pulverulent or granulated) dyeing preparation.

of washing out of the non-fixed dyestuff portions and good fastness to wet laying in a deep black by the application and fixing processes customary in the art of fiber-reactive dyestuffs, for example on cellulosic fiber materials.

EXAMPLE 8

60 parts of a 50% strength electrolyte salt-containing dyestuff powder of the disazo dyestuff of the abovementioned formula (A), 4 parts of a 50% strength electrolyte salt-containing dyestuff powder of the monoazo dyestuff of the abovementioned formula (B), 14 parts of a 50% strength electrolyte salt-containing dyestuff powder of the dyestuff of the abovementioned formula (E) and 10 parts of a 50% strength electrolyte salt-containing dyestuff powder of the dyestuff of the formula (H)

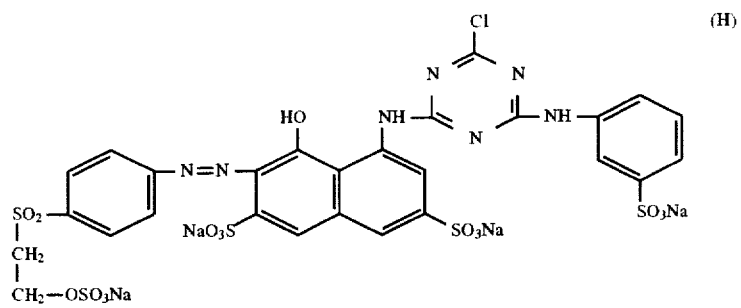

(H)

are mixed with one another.

The resulting aqueous dyestuff mixture according to the invention produces dyeings and prints with a good ease of washing out of non-fixed dyestuff portions and good fastness to wet laying in a deep black by the application and fixing processes customary in the art of fiber-reactive dyestuffs, for example on cellulosic fiber materials.

EXAMPLE 9

100 parts of an aqueous solution comprising 30 parts of the disazo dyestuff of the formula (A) and 0.3 part of the monoazo dyestuff of the formula (B) and 60 parts of an aqueous solution comprising 0.3 part of the monoazo dyestuff of the formula (E) and 5.7 parts of the monoazo dyestuff of the formula (G) (where these solutions can also comprise electrolyte salts, such as sodium chloride, or customary auxiliaries, such as, for example, buffers and surfactant substances) are mixed with one another. The resulting dyestuff solution has a total dyestuff content of 23%. It is concentrated to a dyestuff content of 25% by pressure permeation and can be employed as a liquid preparation directly for the preparation of dye liquors and dyebaths in the customary dyeing processes.

EXAMPLE 10

100 parts of an aqueous solution comprising 30 parts of the disazo dyestuff of the formula (A) and 0.3 part of the monoazo dyestuff of the formula (B), 60 parts of an aqueous solution comprising 0.3 part of the monoazo dyestuff of the formula (E) and 5.7 parts of the monoazo dyestuff of the formula (G) and 18 parts of an aqueous solution comprising 1.8 parts of the monoazo dyestuff of the formula (H) and 3 parts of a condensation product of naphthalenesulfonic acid and formaldehyde (where these solutions can also comprise electrolyte salts, such as sodium chloride, or other customary auxiliaries, such as buffer substances) are mixed with one another. The resulting dyestuff solution has a total dyestuff content of 21%. It can be employed as a liquid preparation directly for the preparation of dye liquors and dyebaths in the customary dyeing processes.

EXAMPLES 11 TO 28

The following Tabular Examples describe further dyestuff mixtures according to the invention with which deep black dyeings, for example on cellulosic fiber materials, are obtainable in customary dyeing and printing processes. The percentage data of the individual dyestuff proportions are based on the total dyestuff content (the individual dyestuffs designated with letters are either already mentioned in the above Embodiment Examples or described by their formulae after the table). The mixtures are as a rule, as is customary in the case of water-soluble dyestuffs, present as dyestuff mixtures which comprise electrolyte salts (such as sodium chloride and sodium sulfate), the electrolyte salt content as a rule being between 30 and 60% by weight, based on the total weight of the dyestuff-containing products; such preparations can comprise buffer substances and other customary auxiliaries, such as dyeing auxiliaries. These dyestuff mixtures described in the Tabular Examples can also be present as aqueous solutions (liquid preparations), the total dyestuff content in the liquid preparation as a rule being between 10 and 50%.

| Ex. | Dyestuff mixture according to the invention of ... % of dyestuff + ... % of dyestuff (...) + ...... | | | | |
|---|---|---|---|---|---|
| 11 | 82.4% (A), | 4.1% (B), | 4.1% (C), | 6.3% (E), | 3.0% (G) |
| 12 | 79.4% (A), | 4.75% (B), | 15.85% (K) | | |
| 13 | 79.55% (A), | 4.25% (B), | 2.4% (C), | 13.8% (K) | |
| 14 | 80.2% (A), | 4.3% (B), | 8.3% (E), | 7.2% (K) | |
| 15 | 78.95% (A), | 5.25% (B), | 6.3% (E), | 9.5% (K) | |
| 16 | 74.5% (A), | 3.7% (B), | 16.1% (E), | 5.7% (H) | |
| 17 | 77.5% (A), | 2.05% (B), | 15.0% (E), | 5.45% (H) | |
| 18 | 77.15% (A), | 4.1% (B), | 2.05% (C), | 13.35% (E), | 0.25% (G), 3.1% (D) |
| 19 | 78.35% (A), | 3.65% (B), | 2.35% (C), | 13.3% (E), | 0.5% (G), 1.85% (D) |
| 20 | 75.2% (A), | 4.25% (B), | 14.8% (E), | 0.25% (G), | 2.0% (H), 3.5% (F) |
| 21 | 75.35% (A), | 4.55% (B), | 14.6% (E), | 0.5% (G), | 2.25% (H), 2.75% (F) |
| 22 | 77.75% (A), | 4.15% (B), | 15.0% (E), | 3.1% (I) | |
| 23 | 77.5% (A), | 4.15% (B), | 15.0% (E), | 3.35% (J) | |
| 24 | 81.1% (A), | 4.3% (B), | 8.9% (E), | 4.05% (G), | 1.65% (N) |
| 25 | 80.0% (A), | 4.25% (B), | 11.2% (E), | 3.45% (G), | 1.1% (N) |
| 26 | 81.4% (A), | 4.35% (B), | 11.95% (E), | 1.62% (G), | 0.68% (N) |
| 27 | 77.1% (A), | 4.1% (B), | 15.7% (L), | 3.1% (I) | |
| 28 | 78.75% (A), | 4.2% (B), | 14.45% (M), | 2.6% (J) | |

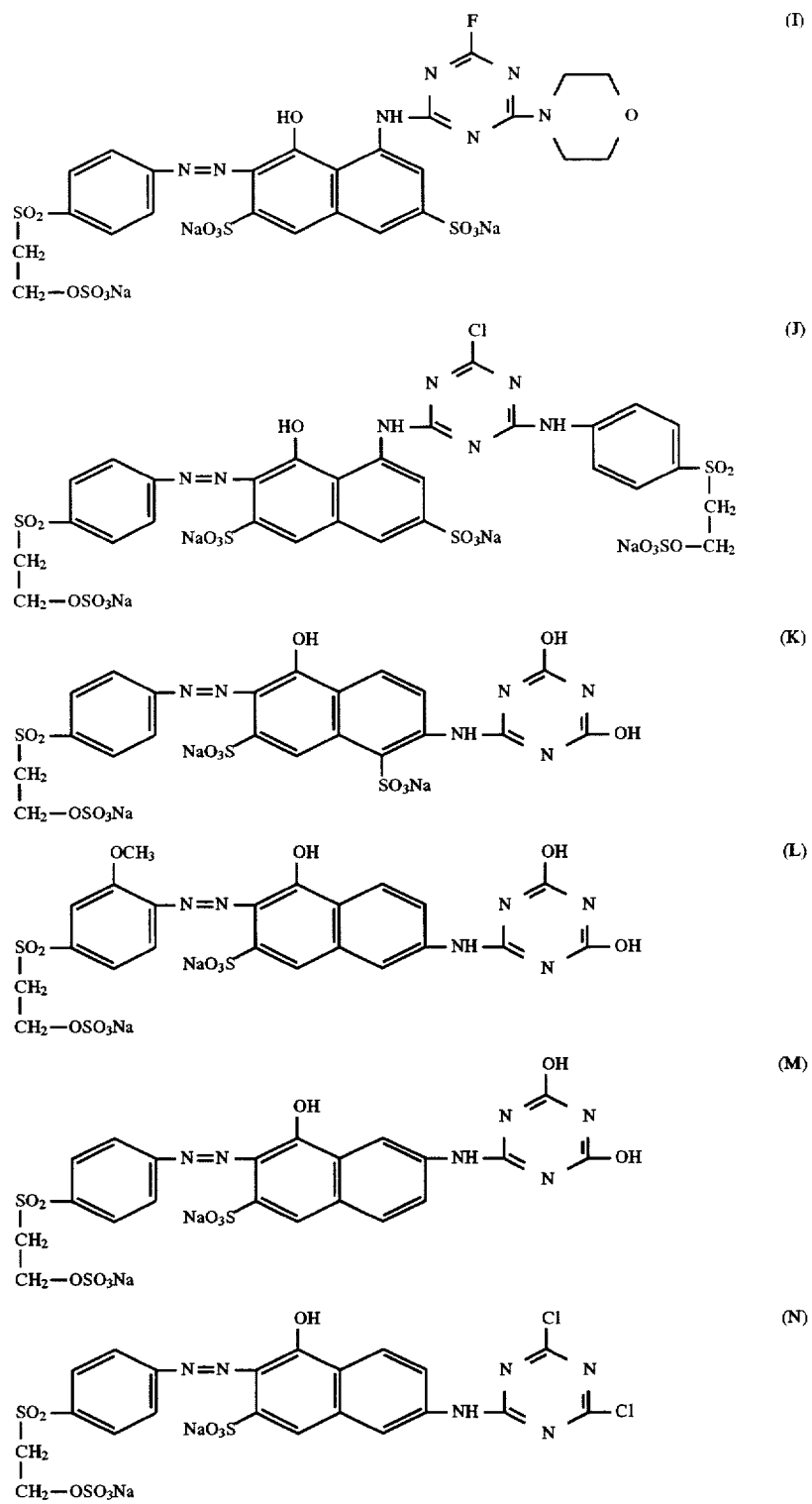

EXAMPLE A 0.1 mol of the known compound of the formula

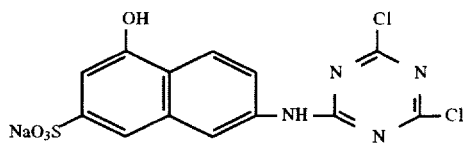

obtainable by customary methods by reaction of 3-amino-8-hydroxy-naphthalene-6-sulfonic acid with cyanuric chloride, is heated at 95° C. in 100 parts of water at a pH of 3.5 for some time. After the reaction mixture has cooled, the 3-(2',4'-dihydroxy-1',3',5'-triazin-6'-yl)-amino-6-sulfo-8-naphthol formed precipitates out as a crystalline product. It is filtered off with suction and isolated.

0.07 mol of this compound is dissolved in 200 parts of water, and a solution, prepared by the customary route, of 0.075 mol of the diazonium salt from 4-(β-sulfatoethylsulfonyl)-aniline is added to the solution. The coupling reaction is carried out at 10° to 15° C. and a pH of 6, to give the azo dyestuff according to the invention, of the formula (written in the form of the free acid)

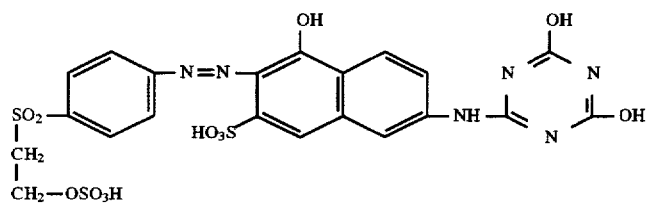

which is isolated from the synthesis solution by spray drying. It has an absorption maximum in the visible range at 496 nm, measured as the sodium salt in water, and dyes the fiber materials mentioned in the description, such as, for example, cotton, in orange shades in a high color strength with good fastness properties. The dyeings obtainable with it, for example, are easily dischargeable.

EXAMPLES B TO F

The following Tabular Examples describe further azo dyestuffs according to the invention corresponding to the formula (A)

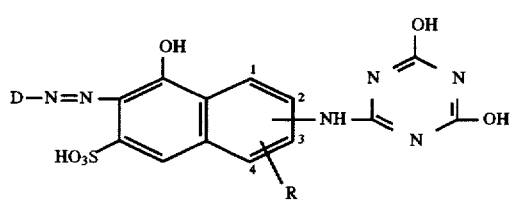

with the aid of their components. They can be prepared in the manner according to the invention, for example analogously to the above Embodiment Example A, from the starting compounds which can be seen from the formula (A) (the diazo component D—NH$_2$, cyanuric chloride and an amino-sulfonaphthol compound). They have very good fiber-reactive dyestuff properties and dye the fiber materials mentioned in the description, such as, in particular, cellulosic fiber materials, in the color shade stated in the particular Tabular Example (in this case for cotton) in a high color strength with good fastness properties. The figures in parentheses in the column ("Color shade") indicate the $\lambda_{max}$-value in the visible range (measured in an aqueous solution of their alkali metal salts).

| | Dyestuff of the formula (A) | | | |
|---|---|---|---|---|
| Ex. | Radical D | Triazinylamino in ... position | Radical R in ... position | Color shade |
| B | 4-(β-Sulfatoethyl-sulfonyl)-phenyl | 1-position | 3-Sulfo | red (521) |
| C | 4-(β-Sulfatoethyl-sulfonyl)-phenyl | " | 4-Sulfo | red |
| D | 2-Methoxy-5-sulfo-4-(β-sulfatoethyl-sulfonyl)-phenyl | 3-position | Hydrogen | reddish orange (510) |
| E | 4-(β-Sulfatoethyl-sulfonyl)-phenyl | 3-position | 4-Sulfo | orange (496) |
| F | 4-(β-Sulfatoethyl-sulfonyl)-phenyl | 2-position | Hydrogen | orange (501) |

We claim:

1. A dyestuff mixture containing one or more disazo dyestuffs corresponding to the formula (1) and of one or more monoazo dyestuffs corresponding to the formula (2) with a proportion of the dyestuff or dyestuffs (2) of at least 3 mol %, based on the total amount of the dyestuffs (1) and (2) in the dyestuff mixture

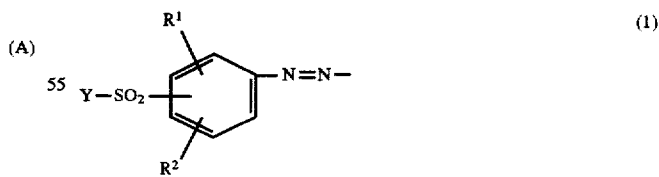

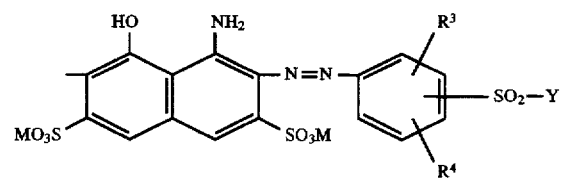

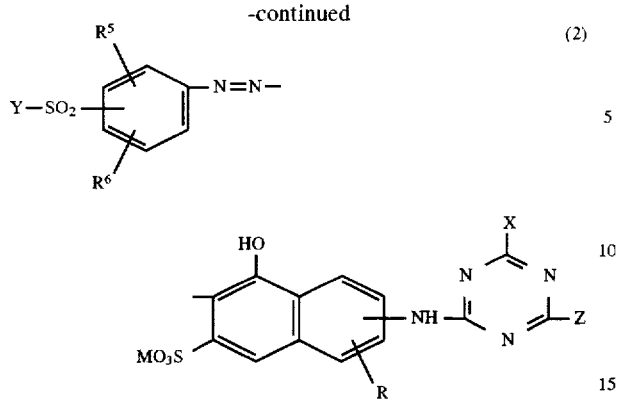

(2)

3. A dyestuff mixture as claimed in claim 1, which additionally comprises one or more monoazo dyestuffs of the formula (4)

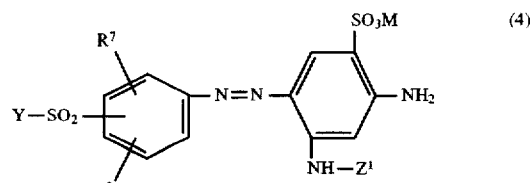

(4)

in which:

M is hydrogen or an alkali metal;

Y is vinyl, β-chloroethyl, β-thiosulfatoethyl or β-sulfatoethyl;

$R^7$ is hydrogen, methyl, ethyl, methoxy or ethoxy;

$R^8$ is hydrogen, methyl, ethyl, methoxy or ethoxy;

$Z^1$ is alkanoyl having 2 to 5 carbon atoms, benzoyl, 2,4-dichloro-1,3,5-triazin-6-yl or a group of the formula (a)

(a)

in which $X^1$ is chlorine, fluorine or cyanoamino and $R^o$ is sulfo, carboxy or a group of the formula —$SO_2$—Y, where Y is vinyl, β-chloroethyl, β-thiosulfatoethyl or β-sulfatoethyl.

4. A dyestuff mixture as claimed in claim 1, which additionally comprises a dyestuff of the formula (5)

in which:

M is hydrogen or an alkali metal;

$R^1$ is hydrogen, methyl, ethyl, methoxy, ethoxy or sulfo;

$R^2$ is hydrogen, methyl, ethyl, methoxy or ethoxy;

$R^3$ is hydrogen, methyl, ethyl, methoxy, ethoxy or sulfo;

$R^4$ is hydrogen, methyl, ethyl, methoxy or ethoxy;

$R^5$ is hydrogen, methyl, ethyl, methoxy, ethoxy or sulfo;

$R^6$ is hydrogen, methyl, ethyl, methoxy or ethoxy;

Y is in each case independently of one another vinyl, β-chloroethyl, β-thiosulfatoethyl or β-sulfatoethyl;

R is bonded in the 3- or 4-position on the 6-sulfo-8-hydroxy-naphth-7-yl radical and is hydrogen or sulfo;

X is chlorine or hydroxy;

Z is chlorine or hydroxy;

the triazinylamino group in formula (2) is bonded in the 2- or 3-position on the 6-sulfo-8-hydroxy-naphth-7-yl radical if R is hydrogen, and bonded in the 1- or 3-position on the 6-sulfo-8-hydroxy-naphth-7-yl radical if R is 4-sulfo, and bonded in the 1-position on the 6-sulfo-8-hydroxy-napth-7-yl radical if R is 3-sulfo;

if X and Z are both chlorine, the mixture necessarily comprises at least one further dyestuff of the formula (2) where X or Z is hydroxy.

2. A dyestuff mixture as claimed in claim 1, which additionally comprises one or two monoazo dyestuffs of the formula (3)

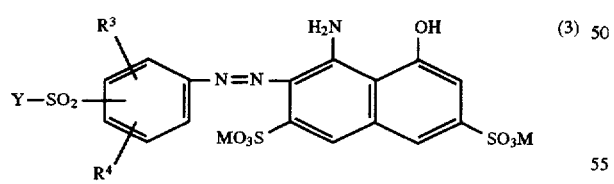

(3)

in which $R^3$, $R^4$, Y and M have the meanings given in claim 1.

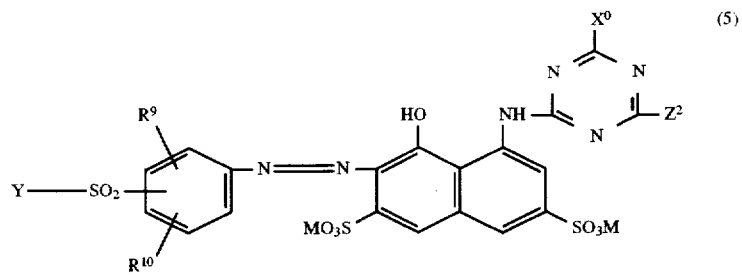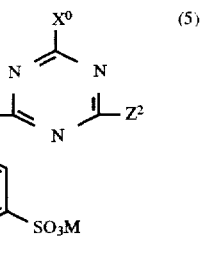

in which:

M is hydrogen or an alkali metal;

$R^9$ is hydrogen, methyl, ethyl, methoxy or ethoxy;

$R^{10}$ is hydrogen, methyl, ethyl, methoxy or ethoxy;

Y is vinyl, β-chloroethyl, β-thiosulfatoethyl or β-sulfatoethyl;

$X^o$ is chlorine, fluorine or hydroxy;

$Z^2$ is chlorine, morpholino or a group of the formula (b)

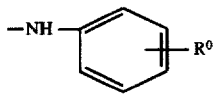

where $R^o$ is sulfo, carboxy or a group of the formula —SO$_2$—Y, where Y is vinyl, β-chloroethyl, β-thiosulfatoethyl or β-sulfatoethyl.

5. A dyestuff mixture as claimed in claim 1, wherein $R^1$, $R^3$ and $R^5$ independently of one another are each hydrogen or methoxy and $R^2$, $R^4$ and $R^6$ are each hydrogen.

6. A dyestuff mixture as claimed in claim 1, wherein $R^1$, $R^2$, $R^3$, $R^4$, $R^5$ and $R^6$ are each hydrogen.

7. A dyestuff mixture as claimed in claim 1, wherein the groups —SO$_2$—Y are bonded to the benzene ring in the para-position relative to the azo groups.

8. A dyestuff mixture as claimed in claim 1, wherein the triazinylamino group in the dyestuff(s) of formula (2) is bonded in the 3-position on the 6-sulfo-8-hydroxy-naphthalene radical and R is hydrogen.

9. A dyestuff mixture as claimed in claim 1, wherein the dyestuffs of the formula (1) and (2) are present in the mixture in a molar mixture ratio of between 97:3 and 60:40.

10. A dyestuff mixture as claimed in claim 1, wherein the dyestuffs of the formulae (1) and (2) are present in the mixture in a molar mixture ratio of between 90:10 and 65:35.

11. A dyestuff mixture as claimed in claim 1, wherein Y is in each case independently of one another vinyl or β-sulfatoethyl.

12. A dyestuff mixture as claimed in claim 2, wherein Y is in each case independently of one another vinyl or β-sulfatoethyl.

13. A dyestuff mixture as claimed in claim 1, wherein, in the dyestuffs of the formula (2), X and Z are both hydroxy.

14. An azo compound corresponding to the formula (3A) or (3B)

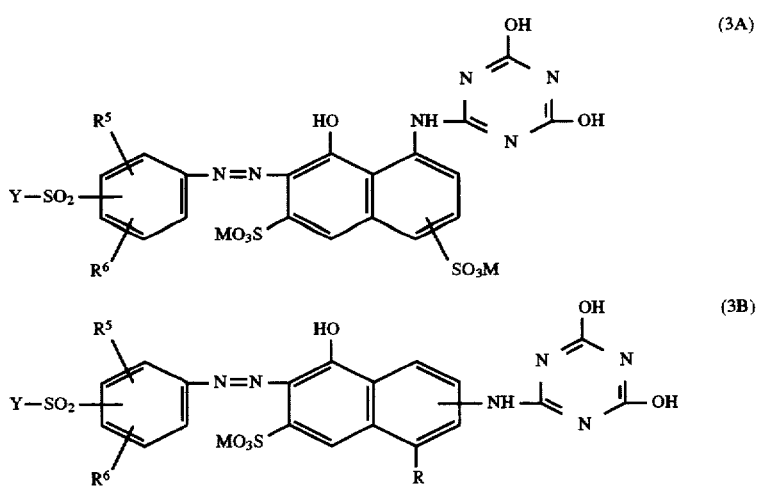

in which:

M is hydrogen or an alkali metal;

R is hydrogen or sulfo;

$R^5$ is hydrogen, methyl, ethyl, methoxy, ethoxy or sulfo;

$R^6$ is hydrogen, methyl, ethyl, methoxy or ethoxy;

Y is vinyl, β-chloroethyl, β-thiosulfatoethyl or β-sulfatoethyl;

the one group —SO$_3$M in formula (3B) is bonded in the meta- or para-position relative to the triazinylamino group;

the triazinylamino group in formula (3B) is bonded in the 2- or 3-position on the 6-sulfo-8-hydroxy-naphth-7-yl radical if R is hydrogen and in the 3-position if R is sulfo.

15. An azo compound corresponding to the formula (3B) as claimed in claim 14, wherein the triazinylamino group is bonded in the 3-position on the 6-sulfo-8-hydroxy-naphthalene radical and R is hydrogen.

16. An azo compound as claimed in claim 14, wherein $R^5$ and $R^6$ are each hydrogen.

17. An azo compound as claimed in claim 14, wherein the group Y—$SO_2$— is bonded to the benzene ring in the para-position relative to the azo group.

18. A method for dyeing fiber material containing hydroxyl or carboxamide groups, or a combination of hydroxyl and carboxamide groups, comprising the step of fixing on said material a dyestuff mixture as claimed in claim 1.

19. A method for dyeing fiber material containing hydroxyl or carboxamide groups, or a combination of hydroxyl and carboxamide groups, comprising the step of fixing on said material a dyestuff as claimed in claim 14.

20. A fiber material containing hydroxyl or carboxamide groups or a combination of hydroxyl and carboxamide groups which has been dyed by a dyestuff mixture of claim 1.

21. A fiber material containing hydroxyl or carboxamide groups or a combination of hydroxyl and carboxamide groups which has been dyed by a dyestuff of claim 14.

* * * * *